(12) United States Patent
Bondu

(10) Patent No.: US 9,108,471 B2
(45) Date of Patent: Aug. 18, 2015

(54) TIRE BEAD FOR HEAVY CIVIL ENGINEERING VEHICLE

(75) Inventor: Lucien Bondu, La Roche Noire (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 217 days.

(21) Appl. No.: 13/515,236

(22) PCT Filed: Dec. 7, 2010

(86) PCT No.: PCT/EP2010/069079
§ 371 (c)(1),
(2), (4) Date: Aug. 31, 2012

(87) PCT Pub. No.: WO2011/070020
PCT Pub. Date: Jun. 16, 2011

(65) Prior Publication Data
US 2013/0146202 A1 Jun. 13, 2013

(30) Foreign Application Priority Data
Dec. 9, 2009 (FR) ...................................... 09 58783

(51) Int. Cl.
*B60C 15/00* (2006.01)
*B60C 15/06* (2006.01)

(52) U.S. Cl.
CPC ............. *B60C 15/06* (2013.01); *B60C 2200/06* (2013.04)

(58) Field of Classification Search
CPC ................................ B60C 15/00; B60C 15/02
See application file for complete search history.

(56) References Cited

U.S. PATENT DOCUMENTS

| 3,406,733 | A | * | 10/1968 | Boileau | ...................... 152/542 |
| 4,044,811 | A | * | 8/1977 | Dudek et al. | ............... 152/452 |
| 4,510,984 | A | * | 4/1985 | Kishida et al. | ............ 152/541 |
| 4,716,950 | A | | 1/1988 | Morikawa et al. | |

(Continued)

FOREIGN PATENT DOCUMENTS

| JP | 61-287804 | | 12/1986 |
| JP | 05124408 | * | 5/1993 |

(Continued)

OTHER PUBLICATIONS

Machine translation of JP 2008-307949, 2008.*
Machine translation of JP 05124408, 1993.*

*Primary Examiner* — Justin Fischer
(74) *Attorney, Agent, or Firm* — Cozen O'Connor

(57) ABSTRACT

Technique for improving the durability of the beads of a radial tire for a heavy vehicle of the civil engineering type, by reducing the rate of spread of cracks initiated at the surface of contact between a first filler polymer material (23a) which is radially innermost and in contact with the bead wire core (22) and a second filler polymer material (23b) radially on the outside of the first filler polymer material. A transition element (24), made of a transition polymer material, of contact thickness (e), is in contact, via its radially internal face (24a), with the first filler polymer material (23a) and in contact, via its radially external face (24b), with the second filler polymer material (23b), and the elastic modulus at 10% elongation of the transition polymer material is somewhere between the respective elastic moduli at 10% elongation of the first and second filler polymer materials.

12 Claims, 2 Drawing Sheets

(56) References Cited

U.S. PATENT DOCUMENTS 5,056,575 A 10/1991 Yamaguchi et al.
5,725,702 A 3/1998 Nakamura et al.
6,701,988 B2 * 3/2004 Yamaguchi .................. 152/539

FOREIGN PATENT DOCUMENTS

| | | |
|---|---|---|
| JP | 08-332813 | 12/1996 |
| JP | 2007-230515 | 9/2007 |
| JP | 2008-307949 | * 12/2008 |

* cited by examiner

TIRE BEAD FOR HEAVY CIVIL ENGINEERING VEHICLE

RELATED APPLICATIONS

This is a U.S. national stage of application No. PCT/EP2010/069079, filed on Dec. 7, 2010. Priority is claimed on the following application: French Application No.: 09/58783 filed on Dec. 9, 2009, the content of which is hereby incorporated herein by reference.

FIELD OF THE INVENTION

The present invention relates to a radial tire intended to be fitted to a heavy vehicle of the civil engineering type.

Although not restricted to this type of application, the invention will be described more specifically with reference to a radial tire intended to be mounted on a dumper, which is a vehicle that carries material dug out of quarries or open-cast mines. The nominal diameter of the rim of such a tire, within the meaning given by the European Tire and Rim Technical Organization or ETRTO, is equal at minimum to 25".

BACKGROUND OF THE INVENTION

The following meanings apply in what follows:

"Meridian plane" is a plane containing the axis of rotation of the tire.

"Equatorial plane" is the plane passing through the middle of the tread surface of the tire and perpendicular to the axis of rotation of the tire.

"Radial direction" is a direction perpendicular to the axis of rotation of the tire.

"Axial direction" is a direction parallel to the axis of rotation of the tire.

"Circumferential direction" is a direction perpendicular to a meridian plane.

"Radial distance" is a distance measured at right angles to the axis of rotation of the tire and from the axis of rotation of the tire.

"Axial distance" is a distance measured parallel to the axis of rotation of the tire and from the equatorial plane.

"Radially" means in a radial direction.

"Axially" means in an axial direction.

"Radially on the inside of or radially on the outside of" means at a shorter, or longer, radial distance.

"Axially on the inside of or axially on the outside of" means at a shorter, or longer, axial distance.

A tire comprises two beads that provide the mechanical connection between the tire and the rim on which it is mounted, the beads being respectively joined, by two sidewalls to a tread intended to come into contact with the ground via a tread surface.

A radial tire more specifically comprises a reinforcement comprising a crown reinforcement, radially on the inside of the tread, and a carcass reinforcement, radially on the inside of the crown reinforcement.

The carcass reinforcement of a radial tire for a heavy vehicle of the civil engineering type usually comprises at least one carcass reinforcement layer made up of metal reinforcing elements coated with a coating polymer material. The metal reinforcing elements are substantially parallel to one another and make an angle of between 85° and 95° with the circumferential direction. The carcass reinforcement layer comprises a main portion, that joins the two beads together and is wound, in each bead, around a bead wire core. The bead wire core comprises a circumferential reinforcing element usually made of metal, surrounded by at least one material which, nonexhaustively, may be made of polymer or textile. The winding of the carcass reinforcement layer around the bead wire core goes from the inside towards the outside of the tire to form a turned-back portion of carcass reinforcement, comprising an end. The turned-back portion of carcass reinforcement, in each bead, anchors the carcass reinforcement layer to the bead wire core of that bead.

Each bead comprises a filler element extending the bead wire core radially outwards. The filler element, in any meridian plane, has a substantially triangular cross section and is made of at least one filler polymer material. The filler element is generally made of a radial stack of at least two filler polymer materials in contact along a contact surface that intersects any meridian plane along a meridian line. The filler element axially separates the main portion of carcass reinforcement from the turned-back portion of carcass reinforcement.

A polymer material, after curing, is mechanically characterized by tensile stress-deformation characteristics that are determined by tensile testing. This tensile testing is performed by the person skilled in the art on a test specimen, in accordance with a known method, for example in accordance with international standard ISO 37, and under normal temperature ($23\pm2°$ C.) and moisture ($50\pm5\%$ relative humidity) conditions defined by international standard ISO 471. The tensile stress measured for a 10% elongation of the test specimen is known as the elastic modulus at 10% elongation of a polymer blend and is expressed in mega pascals (MPa).

A polymer material, after curing, is also mechanically characterized by its hardness. Hardness is notably defined by the Shore A hardness determined in accordance with ASTM D 2240-86.

As the vehicle drives along, the tire, mounted on its rim, inflated and compressed under the load of the vehicle, is subjected to bending cycles, particularly at its beads and its sidewalls.

The bending cycles in particular lead to stresses and deformations primarily in shear and in compression in the filler polymer materials, because of the bending of the bead on the rim flange.

In particular, at the surface of contact between two filler polymer materials, the bending cycles initiate cracks which spread through the filler polymer material which is radially outermost and, over time, are likely to lead to degradation of the tire requiring it to be replaced.

According to the inventors, the initiation of cracks results from the gradient in rigidity between the radially innermost filler polymer material in contact with the bead wire core and the filler polymer material that is radially on the outside of it and adjacent along a contact surface. Deficiencies in cohesion between the two filler polymer materials along their contact surface is a factor that initiates cracking.

The rate at which the cracks spread is dependent firstly on the amplitude and frequency of the stress and strain deformation cycles and secondly on the respective rigidities of the filler polymer materials. By way of example, the elastic modulus at 10% elongation of the filler polymer material which is radially innermost and in contact with the bead wire core can be equal to 3 times the elastic modulus at 10% elongation of the filler polymer material which is radially on the outside of and adjacent to it.

SUMMARY OF THE INVENTION

One object of the invention is to improve the durability of the beads of a radial tire for a heavy vehicle of the civil engineering type, by reducing the rate of spread of cracks initiated at the surface of contact between a first filler polymer material which is radially innermost and in contact with the bead wire core and a second filler polymer material radially on the outside of the first filler polymer material.

According to one aspect of the invention, this objective has been achieved by:
- a tire for a heavy vehicle of the civil engineering type, comprising two beads intended to come into contact with a rim, a carcass reinforcement comprising at least one carcass reinforcement layer made up of metal reinforcing elements,
- the carcass reinforcement layer comprising a main portion of carcass reinforcement which, in each bead, is wound from the inside towards the outside of the tire, around a bead wire core to form a turned-back portion of carcass reinforcement,
- each bead comprising a filler element extending the bead wire core radially outwards,
- the filler element having, in any meridian plane, a substantially triangular cross section and being formed of at least two filler polymer materials,
- a first filler polymer material being radially innermost and in contact with the bead wire core,
- a second filler polymer material being radially on the outside of the first filler polymer material and having an elastic modulus at 10% elongation that is less than the elastic modulus at 10% elongation of the first filler polymer material,
- a transition element, made of a transition polymer material, of constant thickness, being in contact, via its radially internal face, with the first filler polymer material and in contact, via its radially external face, with the second filler polymer material, and
- the elastic modulus at 10% elongation of the transition polymer material being somewhere between the respective elastic moduli at 10% elongation of the first and second filler polymer materials.

According to an embodiment of the invention, it is advantageous to have a transition element, made of a transition polymer material, of constant thickness, in contact, via its radially internal face, with the first filler polymer material and in contact, via its radially external face, with the second filler polymer material.

A transition element is an element that is interposed between a first filler polymer material and a second filler polymer material.

The transition element usually consists of a single transition polymer material. However, it may be made up of a stack in the radial direction of transition polymer materials of which the respective elastic moduli at 10% elongation are somewhere between the respective elastic moduli at 10% elongation of the first and second filler polymer materials and decrease as the radial distance at which the transition polymer materials are located increases.

The thickness of the transition element is the thickness of the transition element measured outside of the zones of contact with, respectively, the main portion of carcass reinforcement and the turned-back portion of carcass reinforcement, in which portions the transition element is tapered out to the respectively radially external and radially internal ends of the transition element. In the case of a transition element that is made up of a stack in the radial direction of transition polymer materials, the thickness of the transition element is the overall thickness of the stack in the radial direction of transition polymer materials.

The transition element is said to be in contact, via its radially internal face, with a first filler polymer material when the radially internal face of the transition element geometrically coincides with the radially external face of the first filler polymer material, except in the axially internal portion of the radially internal face of the transition element in contact with the main portion of carcass reinforcement.

The transition element is said to be in contact, via its radially external face, with a second filler polymer material when the radially external face of the transition element geometrically coincides with the radially internal face of the second filler polymer material, except in the axially external portion of the radially external face of the transition element in contact with the turned-back portion of carcass reinforcement.

The elastic modulus at 10% elongation of the transition polymer material is advantageously somewhere between the respective elastic moduli at 10% elongation of the first and second filler polymer materials, the second filler polymer material having an elastic modulus at 10% elongation which is less than the elastic modulus at 10% elongation of the first filler polymer material. The progressive decrease in elastic moduli at 10% elongation when moving from the first filler polymer material to the transition polymer material, and to the second filler polymer material, gives a decreasing and gradual rigidity gradient, which makes it possible locally to reduce the stresses and deformations in the transition zone between the first and second filler materials and therefore to slow the spread of cracks.

The greater the difference between the respective elastic moduli at 10% elongation of the first and second filler polymer materials, the more significant an advantage afforded by an intermediate elastic modulus at 10% elongation of the transition polymer material. By way of example, in a tire according to the invention, the elastic modulus at 10% elongation of the first filler polymer material is equal to approximately 2.9 times the elastic modulus at 10% elongation of the second filler polymer material.

The thickness of the transition element is advantageously at least equal to 0.1 times the distance between the end of the turned-back portion of carcass reinforcement and the main portion of carcass reinforcement.

The distance between the end of the turned-back portion of carcass reinforcement and the main portion of carcass reinforcement is the distance measured, along the straight line that passes through the end of the turned-back portion of carcass reinforcement and is perpendicular to the main portion of carcass reinforcement, between the axially internal generatrix of the reinforcing elements in the turned-back portion of carcass reinforcement and the axially external generatrix of the reinforcing elements in the main portion of carcass reinforcement.

This minimum thickness of the transition element makes it possible to establish a minimum rigidities gradient, allowing the rate of spread of cracks to be reduced.

The thickness of the transition element is also advantageously at most equal to 0.5 times the distance between the end of the turned-back portion of carcass reinforcement and the main portion of carcass reinforcement.

This is because the thermal dissipation of the transition polymer material is greater than that of the second filler polymer material because of its higher elastic modulus at 10% elongation. As a result, beyond a maximum thickness of the transition element, when the transition element is substituted for part of the second filler polymer material with respect to a reference tire, too high a volume of transition polymer material leads to an increase in bead temperature that is damaging to its life, hence the need to place an upper limit on the thickness of the transition element.

Moreover, the inventors chose to limit the thickness of the transition element in order locally to influence cracking while at the same time limiting the impact that the transition element has on the bending rigidity of the bead. The aim of the transition element is not to allow a variation in the bending rigidity of the bead but to influence the rate of spread of cracks between the first and second polymer filling materials. In other words, the overall bending of the bead on the rim flange is the same, with or without a transition element.

It is also advantageous to have the elastic modulus at 10% elongation of the transition polymer material at least equal to 0.9 times and at most equal to 1.1 times the arithmetic mean of the respective elastic moduli at 10% elongation of the first and second filler polymer materials. This range of values for the elastic modulus at 10% elongation of the transition polymer material guarantees a minimum gradient of rigidities, when moving successively from the first filler polymer material to the transition polymer material and then to the second filler polymer material, hence a significant decrease in the rate of spread of cracks.

The radially internal face of the transition element is advantageously in continuous contact with the main portion of carcass reinforcement between a first point of contact and a last point of contact which is the radially outermost point of the transition element. This continuous surface of contact between the main portion of carcass reinforcement and the transition element makes it possible to reduce the rate of spread of cracks initiated, in this zone of contact, on the axially external face of the main portion of carcass reinforcement and spreading axially outwards through the second filler polymer material.

It is also advantageous for the distance between the first point of contact and the last point of contact of the radially internal face of the transition element with the main portion of carcass reinforcement to be at least equal to the distance and at most equal to three times the distance between the end of the turned-back portion of carcass reinforcement and the main portion of carcass reinforcement.

This distance is the distance between the two straight lines perpendicular to the main portion of carcass and passing respectively through the first and last points of contact of the radially internal face of the transition element with the main portion of carcass reinforcement.

This distance guarantees a zone of contact between the transition element and the main portion of carcass reinforcement that is in a zone of maximum curvature of the main portion of carcass reinforcement, the axially external face of which is a preferred zone for the initiation of cracks. The range of values for this distance, defined as a function of the distance between the end of the turned-back portion of carcass reinforcement and the main portion of carcass reinforcement, guarantees that there will be some transition element present in all of the potential zone in which cracks are initiated, on the axially external face of the main portion of carcass reinforcement.

BRIEF DESCRIPTION OF THE DRAWINGS

The features of the invention will be more readily understood with the aid of the description of attached FIGS. 1 and 2:

To make them easier to understand, FIGS. 1 and 2 are not drawn to scale.

DETAILED DESCRIPTION OF THE DRAWINGS

Figure 1:
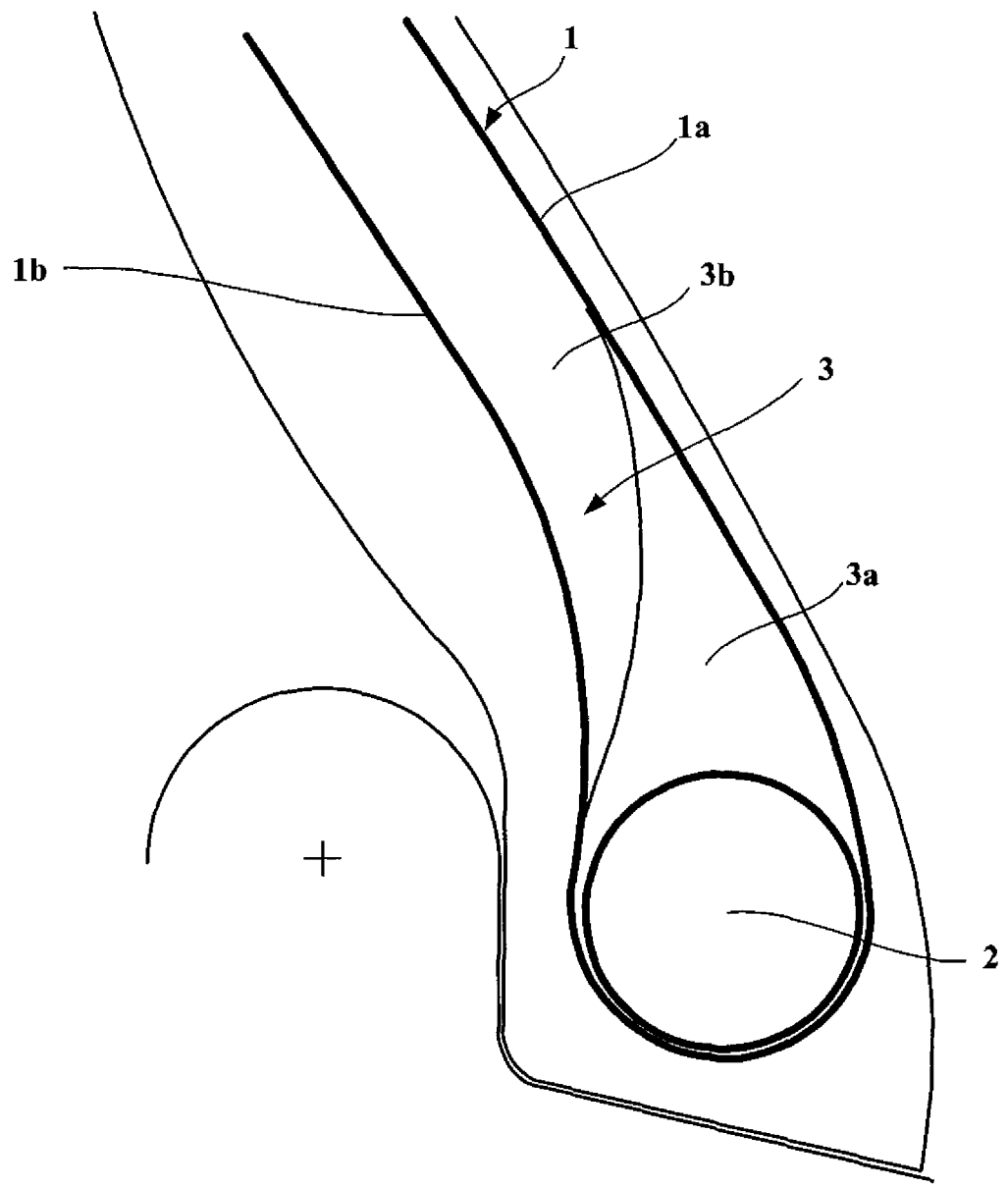
FIG. 1 is a view in cross section on a meridian plane of the bead of a tire for a heavy vehicle of the civil engineering type of the prior art.

FIG. 1 depicts a bead of a tire for a heavy vehicle of the civil engineering type of the prior art, comprising:
- a carcass reinforcement comprising at least one layer of carcass reinforcement 1 consisting of metal reinforcing elements,
- the layer of carcass reinforcement comprising a main portion of carcass reinforcement 1a wound in each bead, from the inside towards the outside of the tire, around a bead wire core 2 to form a turned-back portion of carcass reinforcement 1b,
- each bead comprising a filler element 3 extending the bead wire core radially outwards,
- the filler element having, in any meridian plane, a substantially triangular cross section and being formed of two filler polymer materials,
- a first filler polymer material 3a being radially innermost and in contact with the bead wire core,
- a second filler polymer material 3b being radially on the outside of the first filler polymer material and having an elastic modulus at 10% elongation which is less than the elastic modulus at 10% elongation of the first filler polymer material.

Figure 2:
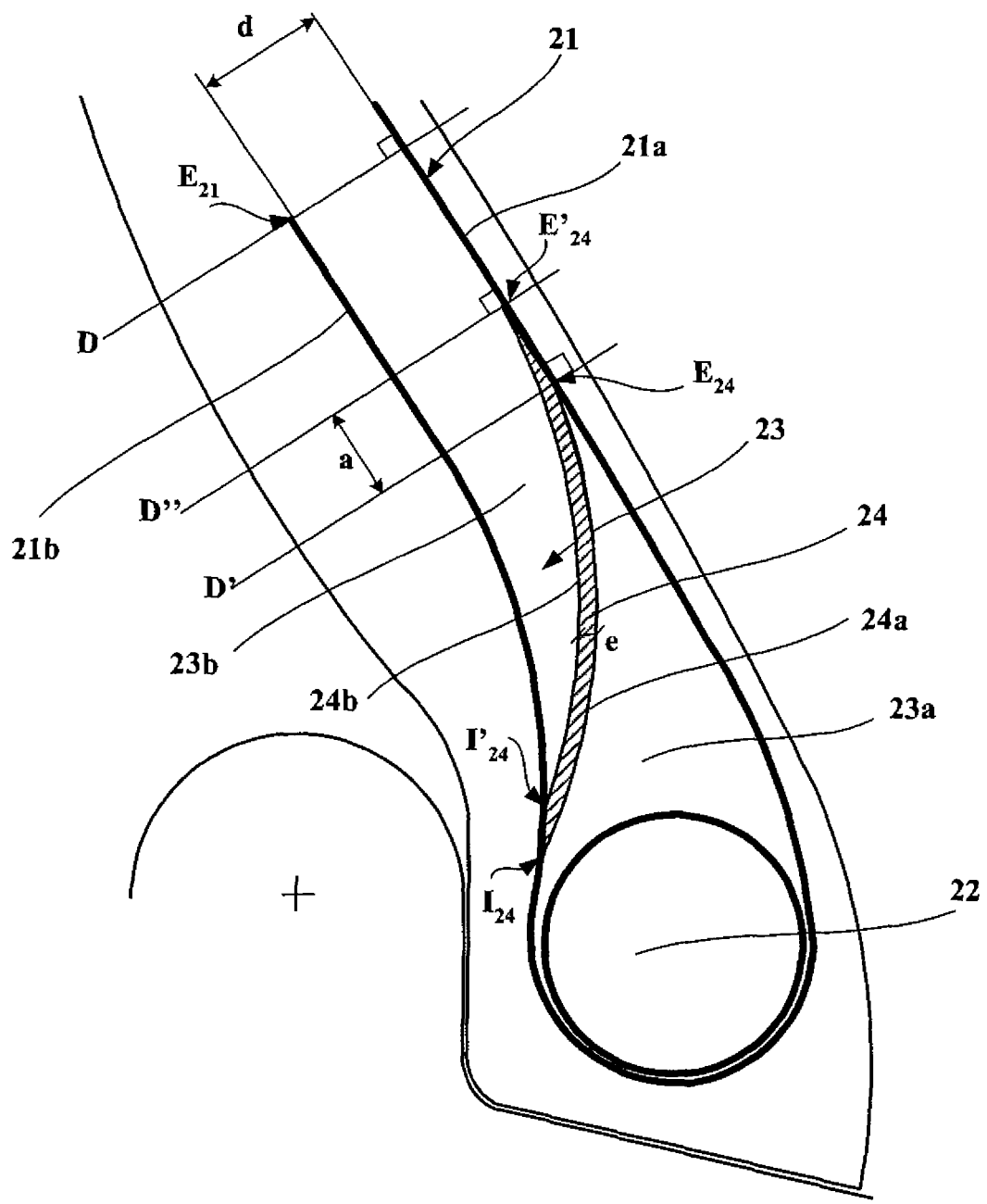
FIG. 2 is a view in cross section on a meridian plane of the bead of a tire for a heavy vehicle of the civil engineering type according to an embodiment of the invention.

FIG. 2 depicts a bead of a tire for a heavy vehicle of the civil engineering type according to the invention, comprising:
- a carcass reinforcement comprising a layer of carcass reinforcement 21 consisting of metal reinforcing elements,
- the layer of carcass reinforcement comprising a main portion of carcass reinforcement 21a wound in each bead, from the inside towards the outside of the tire, around a bead wire core 22 to form a turned-back portion of carcass reinforcement 21b,
- the bead comprising a filler element 23 extending the bead wire core radially outwards,
- the filler element having, in any meridian plane, a substantially triangular cross section and being formed of two filler polymer materials,
- a first filler polymer material 23a being radially innermost and in contact with the bead wire core,
- a second filler polymer material 23b being radially on the outside of the first filler polymer material and having an elastic modulus at 10% elongation which is less than the elastic modulus at 10% elongation of the first filler polymer material,
- a transition element (24) made of a transition polymer material, of constant thickness (e), being in contact, via its radially internal face (24a), with the first filler polymer material and in contact, via its radially external face (24b), with the second filler polymer material, and
- the elastic modulus at 10% elongation of the transition polymer material being somewhere between the respective elastic moduli at 10% elongation of the first and second filler polymer materials.

The transition element 24 has a constant thickness e, outside the zones of contact with the main portion of carcass reinforcement and the turned-back portion of carcass reinforcement respectively, by in which zones the transition element is tapered as far as the respectively radially external $E'_{24}$ and radially internal $I_{24}$ ends of the transition element where the radially internal 24a and radially external 24b faces of the transition element 24 meet.

The radially internal face 24a of the transition element 24 is delimited respectively by its radially innermost point $I_{24}$ in contact with the turned-back portion of carcass reinforcement 23b, and by its radially outermost point E'$_{24}$ in contact with the main portion of carcass reinforcement 21a.

The radially external face 24b of the transition element 24 is delimited respectively by its radially innermost point I$_{24}$ in contact with the turned-back portion of carcass reinforcement 23b and by its radially outermost point E'$_{24}$ in contact with the main portion of carcass reinforcement 21a.

The zone of continuous contact between the transition element 24 and the main portion of carcass reinforcement 21a is achieved along the radially internal face 24a of the transition element 24 and is radially delimited by the, radially innermost, first point of contact E$_{24}$ and the, radially outermost, last point of contact E'$_{24}$ which is also the radially external end of the transition element.

The zone of continuous contact between the transition element 24 and the turned-back portion of carcass reinforcement 21b is achieved along the radially external face 24b of the transition element 24 and is radially delimited by the, radially outermost, first point of contact I'$_{24}$ and the, radially innermost, last point of contact I$_{24}$ which is also the radially internal end of the transition element 24.

The distance d between the end E$_{21}$ of the turned-back portion of carcass reinforcement 21b and the main portion of carcass reinforcement 21a is the distance measured, along the straight line D passing through the end E$_{21}$ of the turned-back portion of carcass reinforcement and perpendicular to the main portion of carcass reinforcement, between the axially internal generatrix of the reinforcing elements of the turned-back portion of carcass reinforcement and the axially external generatrix of the reinforcing elements of the main portion of carcass reinforcement.

The distance a between the respective first and last points of contact of the radially internal face 24a of the transition element 24 and the main portion of carcass reinforcement 21a is the distance measured between the straight lines D' and D" which are perpendicular to the main portion of carcass reinforcement 21a at E$_{24}$ and E'$_{24}$ respectively.

The invention has been studied more particularly in the case of a tire for a heavy vehicle of the dumper type of the size 59/80R63. According to the ETRTO standard, the nominal conditions of use of such a tire are an inflation pressure of 6 bar, a static load of 99 tonnes and a distance covered in one hour of between 16 and 32 km.

The 59/80R63 tire was designed according to the invention, as depicted in FIG. 2.

The thickness e of the transition element 24 is equal to 4.5 mm, i.e. 0.3 times the distance d between the end E$_{21}$ of the turned-back portion of carcass reinforcement and the main portion of carcass reinforcement 21a equal to 15 mm.

The elastic moduli at. 10% elongation of the first filler polymer material, the transition polymer material and the second filler polymer material are respectively equal to 10 MPa, 6.5 MPa and 3.5 MPa. Thus the elastic modulus at 10% elongation of the transition polymer material is somewhere between the respective elastic moduli at 10% elongation of the first and second filler polymer materials and is equal to 0.96 times the arithmetic mean of the respective elastic moduli at 10% elongation of the first and second filler polymer materials.

The distance a between the first point of contact E$_{24}$ and the last point of contact E'$_{24}$ of the radially internal face 24a of the transition element 24 with the main portion of carcass reinforcement 21a is equal to 22.5 mm, i.e. 1.5 times the distance d between the end E$_{21}$ of the turned-back portion of carcass reinforcement 21b and the main portion of carcass reinforcement 21a.

Finite element calculation simulations have been performed respectively on a reference tire, as depicted in FIG. 1, and on a tire according to the invention, as depicted in FIG. 2. For the reference tire, the elongation of the second filler polymer material 3b, in the vicinity of its radially internal face, is equal to 2.5 times the elongation of the first filler polymer material, 3a, in the vicinity of its radially external face. For the tire according to the invention, the elongation of the transition polymer material 24, in the vicinity of its radially internal face 24a, is equal to 1.5 times the elongation of the first filler polymer material 23a in the vicinity of its radially external face. Likewise, for the tire according to the invention, the elongation of the second filler polymer material 23b, in the vicinity of its radially internal face 24a, is equal to 1.5 times the elongation of the transition polymer material 24 in the vicinity of its radially external face.

Therefore the rate at which a crack spreads from the first filler polymer material 23a to the transition polymer material 24 and then from the transition polymer material 24 to the second filler polymer material 23b, in the case of the invention, is slower than the rate at which a crack spreads from the first filler polymer material 3a to the second filler polymer material 3b in the case of the reference tire, because the ratio of the elongation of the transition polymer material 24 to the elongation of the first filler polymer material 23a, and the ratio of the elongation of the second filler polymer material 23b to the elongation of the transition polymer material 24 are smaller than the ratio of the elongation of the second filler polymer material 3b to the elongation of the first filler polymer material 3a.

The invention should not be interpreted as being restricted to the example illustrated in FIG. 2, but can be extended to other embodiment variants, for example, and nonexhaustively concerning the number of transition polymer materials, constituting a stack in the radial direction between the first and second filler polymer materials, or concerning the number of filler materials, greater than 2, constituting the filling element.

The invention claimed is:

1. A tire for a heavy vehicle of the civil engineering type, comprising:
two beads configured to come into contact with a rim; and
a carcass reinforcement comprising at least one carcass reinforcement layer having metal reinforcing elements, said at least one carcass reinforcement layer comprising a main portion of carcass reinforcement that, in each of said two beads, is wound from the inside towards the outside of the tire, around a bead wire core to form a turned-back portion of carcass reinforcement, each of said two beads comprising a filler element extending said bead wire core radially outwards, said filler element having, in any meridian plane, a substantially triangular cross section and being formed of at least two filler polymer materials, a first filler polymer material being radially innermost and in contact with said bead wire core, a second filler polymer material being radially on the outside of said first filler polymer material and having an elastic modulus at 10% elongation that is less than the elastic modulus at 10% elongation of said first filler polymer material,
wherein a transition element, made of a transition polymer material, is in contact, via its radially internal face, with said first filler polymer material and in contact, via its radially external face, with said second filler polymer material, wherein said transition element is positioned between said first and second filler polymer materials such that said first and second filler polymer materials have no direct contact with each other, wherein the elastic modulus at 10% elongation of said transition polymer material is somewhere between the respective elastic moduli at 10% elongation of said first and second filler polymer materials, wherein said radially internal face of said transition element is in continuous contact with said main portion of carcass reinforcement between a first point of contact and a last point of contact which is the radially outermost point of said transition element, and wherein the thickness of said transition element is at most equal to 0.5 times the distance between the end of said turned-back portion of carcass reinforcement and said main portion of carcass reinforcement.

2. The tire of claim 1, wherein the thickness of said transition element is at least equal to 0.1 times the distance between the end of said turned-back portion of carcass reinforcement and said main portion of carcass reinforcement.

3. The tire of claim 1, wherein the elastic modulus at 10% elongation of said transition polymer material is at least equal to 0.9 times and at most equal to 1.1 times the arithmetic mean of the respective elastic moduli at 10% elongation of said first and second filler polymer materials.

4. The tire of claim 1, wherein the distance between a first point of contact and a last point of contact of said radially internal face of said transition element with said main portion of carcass reinforcement, is at least equal to the distance between the end of said turned-back portion of carcass reinforcement and said main portion of carcass reinforcement.

5. The tire of claim 1, wherein the distance between a first point of contact and a last point of contact of said radially internal face of said transition element with said main portion of carcass reinforcement, is at most equal to three times the distance between the end of said turned-back portion of carcass reinforcement and said main portion of carcass reinforcement.

6. A tire for a heavy vehicle of the civil engineering type, comprising:
    two beads configured to come into contact with a rim; and
    a carcass reinforcement comprising at least one carcass reinforcement layer having metal reinforcing elements, said at least one carcass reinforcement layer comprising a main portion of carcass reinforcement that, in each of said two beads, is wound from the inside towards the outside of the tire, around a bead wire core to form a turned-back portion of carcass reinforcement, each of said two beads comprising a filler element extending said bead wire core radially outwards, said filler element having, in any meridian plane, a substantially triangular cross section and being formed of at least two filler polymer materials, a first filler polymer material being radially innermost and in contact with said bead wire core, a second filler polymer material being radially on the outside of said first filler polymer material and having an elastic modulus at 10% elongation that is less than the elastic modulus at 10% elongation of said first filler polymer material, wherein a transition element, made of a transition polymer material, is in contact, via its radially internal face, with said first filler polymer material and in contact, via its radially external face, with said second filler polymer material, wherein said transition element makes contact with both said main portion and said turned-up portion of carcass reinforcement, wherein the elastic modulus at 10% elongation of said transition polymer material is somewhere between the respective elastic moduli at 10% elongation of said first and second filler polymer materials, wherein said radially internal face of said transition element is in continuous contact with said main portion of carcass reinforcement between a first point of contact and a last point of contact which is the radially outermost point of said transition element, and wherein the thickness of said transition element is at most equal to 0.5 times the distance between the end of said turned-back portion of the carcass reinforcement and said main portion of carcass reinforcement.

7. The tire of claim 6, wherein the thickness of said transition element is at least equal to 0.1 times the distance between the end of said turned-back portion of carcass reinforcement and said main portion of carcass reinforcement.

8. The tire of claim 6, wherein the elastic modulus at 10% elongation of said transition polymer material is at least equal to 0.9 times and at most equal to 1.1 times the arithmetic mean of the respective elastic moduli at 10% elongation of said first and second filler polymer materials.

9. The tire of claim 6, wherein the distance between a first point of contact and a last point of contact of said radially internal face of said transition element with said main portion of carcass reinforcement, is at least equal to the distance between the end of said turned-back portion of carcass reinforcement and said main portion of carcass reinforcement.

10. The tire of claim 6, wherein the distance between a first point of contact and a last point of contact of said radially internal face of said transition element with said main portion of carcass reinforcement, is at most equal to three times the distance between the end of said turned-back portion of carcass reinforcement and said main portion of carcass reinforcement.

11. The tire of claim 6, wherein the thickness of said transition element is constant outside of the zone of contact with, respectively, said main portion of carcass reinforcement and said turned-back portion of carcass reinforcement.

12. The tire of claim 1, wherein the thickness of said transition element is constant outside of the zone of contact with, respectively, said main portion of carcass reinforcement and said turned-back portion of carcass reinforcement.

* * * * *